(12) United States Patent
Long

(10) Patent No.: US 11,564,407 B2
(45) Date of Patent: Jan. 31, 2023

(54) DEVICE FOR SYNTHESIZING CARBONATED WATER AND SYSTEM FOR PREPARING CARBONATED WATER

(71) Applicant: CINO Technology (shenzhen) Limited, Shenzhen (CN)

(72) Inventor: Qiyi Long, Shenzhen (CN)

(73) Assignee: CINO TECHNOLOGY (SHENZHEN) LIMITED, Shenzhen (CN)

( * ) Notice: Subject to any disclaimer, the term of this patent is extended or adjusted under 35 U.S.C. 154(b) by 548 days.

(21) Appl. No.: 16/670,076

(22) Filed: Oct. 31, 2019

(65) Prior Publication Data

US 2020/0060314 A1    Feb. 27, 2020

Related U.S. Application Data

(63) Continuation of application No. PCT/CN2018/072874, filed on Jan. 16, 2018.

(30) Foreign Application Priority Data

Aug. 10, 2017   (CN) .......................... 201710682361.2
Jan. 12, 2018   (CN) .......................... 201810032006.5

(51) Int. Cl.
*A23L 2/54*   (2006.01)
*B01F 23/233*   (2022.01)
(Continued)

(52) U.S. Cl.
CPC ............ *A23L 2/54* (2013.01); *B01F 23/2331* (2022.01); *B01F 23/2362* (2022.01); *B01F 23/2363* (2022.01); *B01F 23/237621* (2022.01)

(58) Field of Classification Search
CPC ........... C02F 1/68; B01F 23/2331; A23L 2/54
(Continued)

(56) References Cited

U.S. PATENT DOCUMENTS 5,407,271 A  *  4/1995  Jorgensen ........... B01F 27/1161
                                                           366/265
5,510,060 A       4/1996  Knoll
(Continued)

FOREIGN PATENT DOCUMENTS

CN          2271172 Y      12/1997
CN       102350250 A        2/2012
(Continued)

OTHER PUBLICATIONS

European search report.

*Primary Examiner* — Ibrahime A Abraham
*Assistant Examiner* — Spencer H. Kirkwood
(74) *Attorney, Agent, or Firm* — IPro, PLLC

(57) ABSTRACT

A device for synthesizing carbonated water includes: a device shell, in which a stirring chamber is defined; a rotation shaft, which is accommodated in the stirring chamber; a blade structure, which is accommodated in the stirring chamber and rotatable around the rotation shaft; sidewall ribs, which are distributed in the stirring chamber and arranged on a sidewall of the device shell, each sidewall rib comprising one or more collision interfaces; an input unit, which is arranged on the device shell, positioned below the blade structure, communicated with the stirring chamber, and operable to receive water and carbon dioxide; and an output unit, which is arranged on the device shell, positioned above the blade structure, communicated with the stirring chamber, and operable to deliver carbonated water with a predetermined concentration.

12 Claims, 8 Drawing Sheets

(51) Int. Cl.
*B01F 23/236* (2022.01)
*B01F 23/237* (2022.01)

(58) Field of Classification Search
USPC .......................................................... 99/323.1
See application file for complete search history.

(56) References Cited

U.S. PATENT DOCUMENTS

| | | | | |
|---|---|---|---|---|
| 7,547,002 | B2 * | 6/2009 | Mao | F02M 27/02 |
| | | | | 261/78.2 |
| 8,398,863 | B2 * | 3/2013 | Cho | C02F 1/005 |
| | | | | 210/764 |
| 9,770,694 | B2 | 9/2017 | Psilander | |
| 2011/0268845 | A1 * | 11/2011 | Fantappie | B01F 23/2362 |
| | | | | 426/67 |
| 2013/0048572 | A1 * | 2/2013 | Hawks | C02F 1/66 |
| | | | | 210/170.03 |

FOREIGN PATENT DOCUMENTS

| | | | | |
|---|---|---|---|---|
| CN | 102847452 | A | 1/2013 | |
| CN | 103495374 | A | 1/2014 | |
| CN | 103877880 | A | 6/2014 | |
| CN | 204485715 | U | 7/2015 | |
| CN | 105731500 | A | 7/2016 | |
| CN | 206508854 | U | 9/2017 | |
| CN | 107362706 | A | 11/2017 | |
| CN | 107495839 | A | 12/2017 | |
| DE | 102009031104 | B3 * | 12/2010 | .............. A23L 2/54 |
| EP | 2821129 | A1 | 1/2015 | |
| WO | 2012177977 | A2 | 12/2012 | |

* cited by examiner

| Under one standard atmospheric pressure (01.3Kpa) | | | | | | | |
|---|---|---|---|---|---|---|---|
| Temperature (°C) | Solubility (V/V) | Temperature (°C) | Solubility (V/V) | Temperature (°C) | Solubility (V/V) | Temperature (°C) | Solubility (V/V) |
| 0 | 1.713 | 8 | 1.282 | 16 | 0.985 | 24 | 0.781 |
| 1 | 1.646 | 9 | 1.237 | 17 | 0.956 | 25 | 0.759 |
| 2 | 1.584 | 10 | 1.194 | 18 | 0.928 | 26 | 0.738 |
| 3 | 1.527 | 11 | 1.154 | 19 | 0.902 | 27 | 0.718 |
| 4 | 1.473 | 12 | 1.117 | 20 | 0.878 | 28 | 0.699 |
| 5 | 1.424 | 13 | 1.083 | 21 | 0.854 | 29 | 0.682 |
| 6 | 1.377 | 14 | 1.050 | 22 | 0.829 | 30 | 0.655 |
| 7 | 1.331 | 15 | 1.019 | 23 | 0.804 | | |

FIG. 1

| Pressure MPa | Temperature (°C) | | | | | | | | | | |
|---|---|---|---|---|---|---|---|---|---|---|---|
| | 0 | 10 | 20 | 30 | 40 | 50 | 60 | 70 | 80 | 90 | 100 |
| 0.2 | | 2.30 | 1.72 | 1.23 | | | | | | | |
| 0.4 | | 4.70 | 3.40 | 2.50 | | | | | | | |
| 0.6 | | 6.75 | 4.83 | 3.70 | | | | | | | |
| 0.8 | | 8.85 | 6.40 | 4.80 | | | | | | | |
| 1.0 | | 10.70 | 7.85 | 5.83 | | | | | | | |
| 2.5 | 30.46 | 20.80 | 18.82 | 14.54 | 11.62 | 9.71 | 8.51 | 7.44 | 6.36 | 5.62 | 5.36 |
| 5.0 | 36.89 | 36.68 | 30.52 | 24.65 | 20.35 | 17.25 | 14.48 | 12.78 | 12.04 | 11.11 | 10.18 |
| 10 | 49.13 | 38.39 | 33.26 | 30.43 | 27.81 | 25.63 | 23.95 | 21.94 | 19.64 | 18.09 | 17.67 |
| 20 | 47.33 | 41.03 | 36.32 | 33.04 | 30.74 | 29.14 | 28.17 | 27.25 | 26.29 | 25.74 | 25.69 |
| 30 | 45.11 | 41.84 | 38.69 | 35.72 | 33.22 | 31.34 | 30.15 | 29.60 | 29.51 | 29.68 | 29.53 |
| 40 | | | 40.09 | 37.08 | 34.87 | 33.29 | 31.65 | 31.24 | 32.03 | 32.42 | 32.39 |
| 50 | | | 41.22 | 38.82 | 36.73 | 31.75 | 23.22 | 13.16 | 6.27 | 9.98 | 34.40 |
| dm³/kg water | | | | | | | | | | | |

FIG. 2

DEVICE FOR SYNTHESIZING CARBONATED WATER AND SYSTEM FOR PREPARING CARBONATED WATER

CROSS-REFERENCE TO RELATED APPLICATION

This disclosure is a continuation of International Patent Application No. PCT/CN2018/072874, filed on Jan. 16, 2018, which is based upon and claims priority to Chinese Patent Application No. 201810032006.5, filed on Jan. 12, 2018, titled "Device for synthesizing carbonated water and system for preparing carbonated water" and Chinese Patent Application No. 201710682361.2, filed on Aug. 10, 2017, titled "Device for generating carbonated water through instant mixing of water and carbon dioxide", the entire contents of which are incorporated herein by reference.

TECHNICAL FIELD

The present application relates to the technical field of carbonated water preparation, and in particular, relates to a device for synthesizing carbonated water and a system for preparing carbonated water.

BACKGROUND

Carbonated water is a common beverage well populated among people, which is prepared mainly by dissolving a large amount of carbon dioxide in water. Different carbonated beverages may be prepared by adding one or a plurality of other raw materials to the carbonated water, for example, Coca Cola and Sprite.

For a better drinking taste of the carbonated water or the carbonated beverage, it is desired that the solubility of carbon dioxide reaches a value between 3.0 and 4.0 V/V. However, at the room temperature (25° C. and one standard atmospheric pressure), the saturated solubility of carbon dioxide in the water is merely 0.759 V/V.

Therefore, a series of devices and apparatuses are needed to prepare carbonated water with a high solubility of carbon dioxide.

SUMMARY

One embodiment of the present application provides a device for synthesizing carbonated water, the device for synthesizing carbonated water includes: a device shell, in which a stirring chamber is defined; a rotation shaft, which is accommodated in the stirring chamber; a blade structure, which is accommodated in the stirring chamber and rotatable around the rotation shaft; a plurality of sidewall ribs, which are distributed in the stirring chamber and arranged on a sidewall of the device shell, each sidewall rib including one or more collision interfaces; an input unit, which is arranged on the device shell, positioned below the blade structure, communicated with the stirring chamber, and operable to receive water and carbon dioxide; and an output unit, which is arranged on the device shell, positioned above the blade structure, communicated with the stirring chamber, and operable to deliver carbonated water with a predetermined concentration.

BRIEF DESCRIPTION OF THE DRAWINGS

One or more embodiments are illustrated by way of example, and not by limitation, in the figures of the accompanying drawings, wherein components having the same reference numeral designations represent like components throughout. The drawings are not to scale, unless otherwise disclosed.

FIG. 1 illustrates solubilities of carbon dioxide under different temperatures;

FIG. 2 illustrates solubilities of carbon dioxide under different temperatures and different pressures;

DETAILED DESCRIPTION

Figure 3:
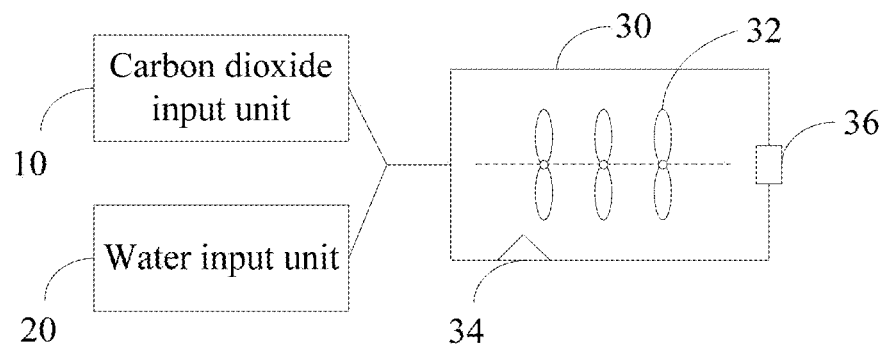
FIG. 3 is a schematic structural block diagram of a device for synthesizing carbonated water according to one embodiment of the present application.

For better understanding of the present application, the present application is described in detail with reference to attached drawings and specific embodiments. It should be noted that, when an element is defined as "being secured or fixed to" another element, the element may be directly positioned on the element or one or more centered elements may be present therebetween. When an element is defined as "being connected or coupled to" another element, the element may be directly connected or coupled to the element or one or more centered elements may be present therebetween. In the description of the present application, it should be understood that the terms "upper", "lower", "inner", "outer", "bottom" and the like indicate orientations and position relationships which are based on the illustrations in the accompanying drawings, and these terms are merely for ease and brevity of the description, instead of indicating or implying that the devices or elements shall have a particular orientation and shall be structured and operated according to the particular orientation. Accordingly, these terms shall not be construed as limiting the present application. In addition, the terms "first", "second" and "third" are merely for the illustration purpose, and shall not be construed as indicating or implying a relative importance.

Unless the context clearly requires otherwise, throughout the specification and the claims, technical and scientific terms used herein denote the meaning as commonly understood by a person skilled in the art. Additionally, the terms used in the specification of the present application are merely for description the embodiments of the present application, but are not intended to limit the present application. As used herein, the term "and/or" in reference to a list of two or more items covers all of the following interpretations of the term: any of the items in the list, all of the items in the list and any combination of the items in the list.

In addition, technical features involved in various embodiments of the present application described hereinafter may be combined as long as these technical features are not in conflict.

Carbon dioxide may be dissolved in water, and reacts with water to produce carbonic acid. However, carbonic acid is an instable substance, and is produced by a reversible chemical reaction process. Reaction equilibrium is subject to many physical and chemical factors. FIG. 1 shows solubilities of carbon dioxide in water at different temperatures under a standard atmospheric pressure. FIG. 2 shows solubilities of carbon dioxide in water under different temperatures and pressures. As listed in FIG. 1 and FIG. 2, with decrease of the temperature of water and constant increase of the pressure, the solubility of carbon dioxide correspondingly increases. In addition, a contact area of water and carbon dioxide also affect the solubility of carbon dioxide in water, and a larger contact area is favorable to dissolution of carbon dioxide in water.

In general, the solubility (that is, an amount of the generated carbonic acid) of carbon dioxide in water is mainly dependent on the following three factors: 1. the temperature of water; 2. the pressure of water-gas; and 3. the contact area of water and carbon dioxide.

For the preparation of carbonated water with a high carbonic acid content (which means a good taste), generally, a particular device or method is employed to improve the solubility of carbon dioxide in water with respect to the above three factors.

In high-pressure tank mixing, the solubility of carbon dioxide is improved by: firstly filling carbon dioxide gas to the pressurized tank to reach a gas pressure of 4.5 kg/cm$^2$ for providing a high-pressure environment. Afterwards, cold water is injected by an atomization nozzle at a high pressure, and the water is made to be in contact with the carbon dioxide in the form of water mist, such that the contact area between the water and the carbon dioxide is increased. Finally, the injected water is cold water with a low temperature, such that the carbon dioxide has a high solubility.

However, in the above method, a high pressure-resistant tank and a complicated pressure control system need to be used. Therefore, the device maintenance cost is high. In addition, while the pressurized tank delivers water constantly, the carbon dioxide content in the carbonated water may be constantly lowered. Further, for a large water storage amount, the tank has a large volume, and needs to store a large amount of carbonated water. When the tank is not used for a long period of time, cleaning the deteriorated carbonated water in the tank is time consuming and troublesome.

If pipe-based immediate and static mixing is employed, carbonated water may be prepared in a non-interrupted flowing fashion. This prevents a series of problems such as complicated maintenance in the high-pressure tank fixing.

The pipe-based immediate and static mixing may be specifically as follows. Firstly, cold water and carbon dioxide are respectively pressurized to a desired pressure (for example, 4.5 kg/cm$^2$). Afterwards, the cold water and the carbon dioxide are respectively injected to a pipe equipped with a static mixing pipe core. The cold water and the carbon dioxide are partitioned, fused and impacted for multiple times when flowing through the static mixing pipe core, and a great water-gas pressure is produced by impacts. The water and the carbon dioxide are spun out (to improve the contact area between the two), such that more carbon dioxide is dissolved in the water.

However, this way restricts a pressure application range between the cold water and the carbon dioxide, and imposes high requirements on the gas pressure and the water pressure. When the pressure application range is exceeded, the ratio of the water to the gas flowing through the pipe is mismatched, making the contact area between the water and the carbon dioxide rapidly reduced.

To overcome the defect in the pipe-based immediate and static mixing, an embodiment of the present application provides a device for synthesizing carbonated water, which may improve the water-gas pressure and the contact area therebetween by a rotatable blade structure. In this way, the device may still operate in a broader pressure application range, such that the cost is lowered, and carbonated water having a good taste may be constantly prepared.

FIG. 3 is a functional block diagram of a device for synthesizing carbonated water according to an embodiment of the present application. As illustrated in FIG. 3, the device for synthesizing carbonated water includes: a carbon dioxide input unit 10 operable to receive carbon dioxide, a water input unit 20 operable to receive water, and a device body 30.

The carbon dioxide input unit 10 is communicated with the device body 30, and is used as a gas input unit to deliver carbon dioxide to the device body 30. The carbon dioxide input unit 10 is a connection port, which may employ a connection structure adaptive to a carbon dioxide gas source according to the actual situation.

In some embodiments, the carbon dioxide input unit 10 may also be provided with one or a plurality of control valves (for example, a switch valve, or a flow rate valve), operable to control a flow or a gas pressure of the carbon dioxide delivered to the device body 30.

The water input unit 20 is also communicated with the device body 30, and is used as a liquid input unit to deliver water to the device body 30. Similar to the carbon dioxide input unit 10, the water input unit 20 is also a connection port, and is connected to a water output unit of a water supply device in a sealing fashion.

In some embodiments, the water input unit 20 may also be provided with one or a plurality of valves operable to control a flow rate, a flow and/or a pressure. A flow or a pressure of the water is regulated by the control valve to adapt to the flow or the gas pressure of the carbon dioxide.

The device body 30 includes a blade structure 32, a collision interface 34 and an output unit 36. The blade structure 32 mixes the delivered carbon dioxide and water in a rotary stirring fashion, and damages a state where the water and the gas are delaminated, such that a contact area between the carbon dioxide and the water and a contact time thereof are increased. The collision interface 34 provides a solid and tough collision surface, and converts momentum into a great water-gas pressure. Upon stirring-based mixing, the final produced carbonated water is delivered from the output unit 36 of the device body 30.

The blade structure 32 is a moveably rotating mechanism rotatable around a rotation shaft, and is operable to practice an energy conversion unit for conversion between kinetic energy and mechanical energy of a fluidizing working medium. The rotatable blade structure 32 may drive and partition the water and the carbon dioxide delivered to the device body 30, and thus damaging the delamination between water and gas formed due to a density difference (achieving the effect of stirring).

The blade structure may be a proactive rotating mechanism, or may be a passive rotating mechanism. When the proactive rotating mechanism is employed, the blades are driven to rotate by a corresponding power mechanism, which may increase the kinetic energy of the water and the carbon dioxide. When the passive rotation mechanism is employed, the blades are driven to rotate by the mixture of the water and the carbon dioxide. In this way, it is required that the delivered water and carbon dioxide have a great kinetic energy (for example, a great pressure or flow rate), which, however, may save the power mechanism for driving the blades.

Figure 4:
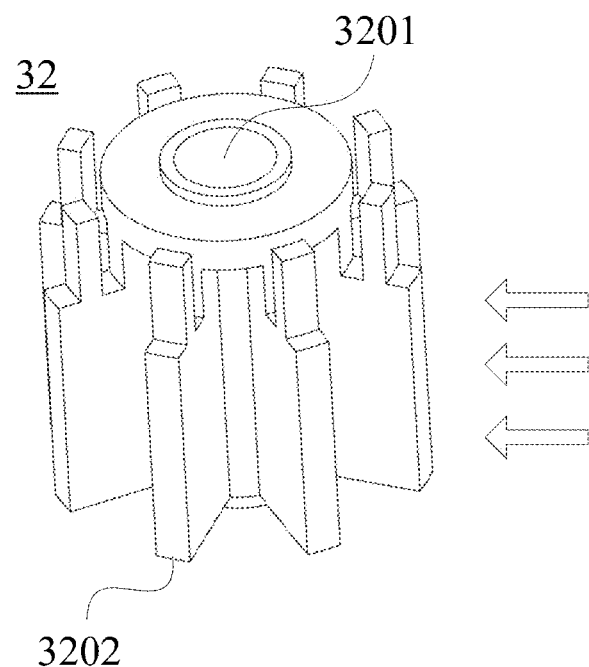
FIG. 4 is a schematic structural diagram of a blade structure according to one embodiment of the present application.

FIG. 4 is a schematic structural diagram of a blade structure according to one embodiment of the present application. As illustrated in FIG. 4, the blade structure 32 is a turbine. The turbine is rotatable around a rotation shaft 3201, and the turbine is provided with a plurality of blades 3202 extending along an axial direction. A projection of the blades 3202 on a plane where the rotation shaft 3201 is arranged is a straight line.

The water and/or the carbon dioxide is injected from side surfaces of the blades 3202, and impacts, as the fluidizing working medium, the blades 3202 to drive the turbine to rotate around the rotation shaft 3201. The water and the carbon dioxide are mixed by the rotation of the turbine, and equally divided according to blade angles of the turbine.

Specifically, the water input unit 20 and the carbon dioxide input unit 10 may be respectively arranged on both sides of the device body 30, communicated with a water pump and a gas valve, and inject the water and the carbon dioxide to a stirring chamber.

In some other embodiments, the water input unit 20 and the carbon dioxide input unit 10 may also be simplified as one input unit. The water and the carbon dioxide are firstly mixed in a mixing container such as a three-way tube or the like, and then injected to the stirring chamber via the input unit in the form of a water-gas mixture.

Figure 5:
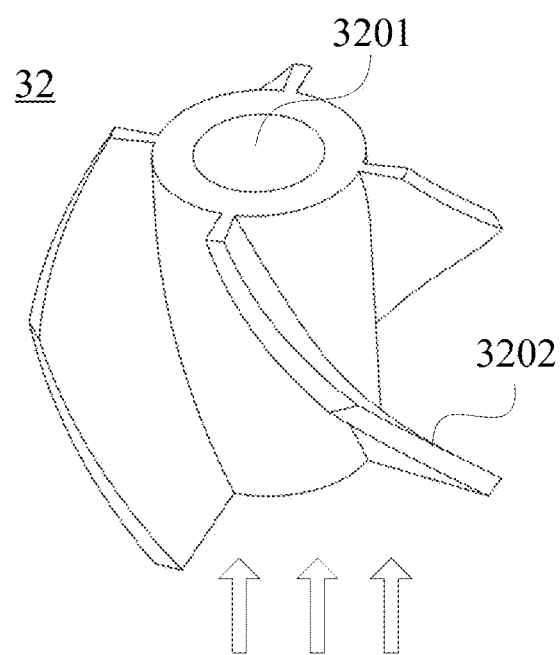
FIG. 5 is a schematic structural diagram of a blade structure according to another embodiment of the present application.

More specifically, the blades 3202 of the turbine may also be in different types. FIG. 5 is a schematic structural diagram of another blade structure according to one embodiment of the present application. As illustrated in FIG. 5, the blades 3202 of the turbine may employ a spiral structure, wherein a projection of the spiral structure on the plane where the rotation shaft 3201 is arranged is an S-shaped curve. In this way, the water and the carbon dioxide may be delivered to the device body 30 from bottom portions of the blades 3202, and impact the blades 3202 to drive the turbine to rotate around the rotation shaft 3201.

In some other embodiments, the blade structure may also include a plurality of different turbines. For example, the turbines having two different blade shapes as illustrated in FIG. 4 and FIG. 5 may be coaxially connected in series for use. When these two turbines are employed, the positions and shapes of the curves are different. Therefore, under driving by the water-gas mixture, rotational speed difference may be caused, such that turbulence may be caused between the turbines, which enhances high-speed stirring between the water and the carbon dioxide, and cause more carbon dioxide to be dissolved in the water.

In this embodiment, the turbine is a passive turbine, which is driven to rotate by impacts by the high-pressure carbon dioxide and water. Design of the passive turbine may save the corresponding transmission mechanism and power mechanism. In some other embodiments, the turbine may also be a proactive turbine, which is driven to rotate under driving by the power mechanism (for example, a motor). In this case, kinetic energy may be provided for the carbon dioxide and the water to reduce the pressure needed for injecting the carbon dioxide and the water to the stirring chamber.

The collision interface 34 is a collision surface formed by a protrusion or a sidewall inside the device body 30. The collision surface may have any suitable shape, for example, a circular arc surface, a straight line surface, a shape acute angle or the like.

The carbon dioxide and the water in the device body 30 both have a specific flow rate. When the carbon dioxide and the water impact the collision interface 34, due to instantaneous variations of the flow rate (which is lowered to 0), the momentum of the carbon dioxide and the water enables the carbon dioxide and the water to acquire a greater water-gas pressure, such that the carbon dioxide is dissolved in the water.

Specifically, the collision surface 34 may be specifically a plurality of sidewall ribs arranged on an inner sidewall of the device body 30. These protruded ribs are capable of providing a solid and sharp surface, which creates a greater water-gas pressure and breaks up the water-gas mixture to minute particles which may rebound.

The collision interface 34 may also be blade ribs arranged on a top side of the blade 3202. A rotational speed difference between the turbines connected in series or a rebounding force from the sidewall may drive the water-gas mixture to collide the blade ribs on the blades of the turbines, which achieves the same effect as that of the sidewall ribs.

In this embodiment, with the blade structure and the collision interface, the carbon dioxide and the water have a sufficient contact surface, and a great water-gas pressure is produced, such that the carbon dioxide has a high solubility in the water.

In some embodiments, for the sake of maintaining a high pressure in the stirring chamber and ensuring a sufficient momentum of the water and the carbon dioxide, the output unit 36 may be designed as an orifice having a flow control effect. This orifice may be specifically an output unit with a slightly narrower aperture and in any suitable shape.

A person skilled in the art may combine, adjust or reasonably and adaptively transform the structures disclosed in the above embodiments to obtain a device for synthesizing carbonated water for stirring and mixing the carbon dioxide and the water. The specific possible structures of the device for synthesizing carbonated water may be described in detail with reference to the accompanying drawings hereinafter.

It should be noted that these specific structures are merely intended to exemplarily describe the process of mixing the carbon dioxide and the water in the device for synthesizing carbonated water, instead of limiting the specific structures of the device for synthesizing carbonated water according to the present application. For brevity and ease of description, a person skilled in the art may make reasonable and adaptive transformations or adjustments for the specific structures of the device for synthesizing carbonated water according to the actual needs and the water-gas mixing principle disclosed in the embodiments of the present application to obtain technical solutions of the device for synthesizing carbonated water. These possible technical solutions are not exhaustively illustrated herein.

Figure 6:
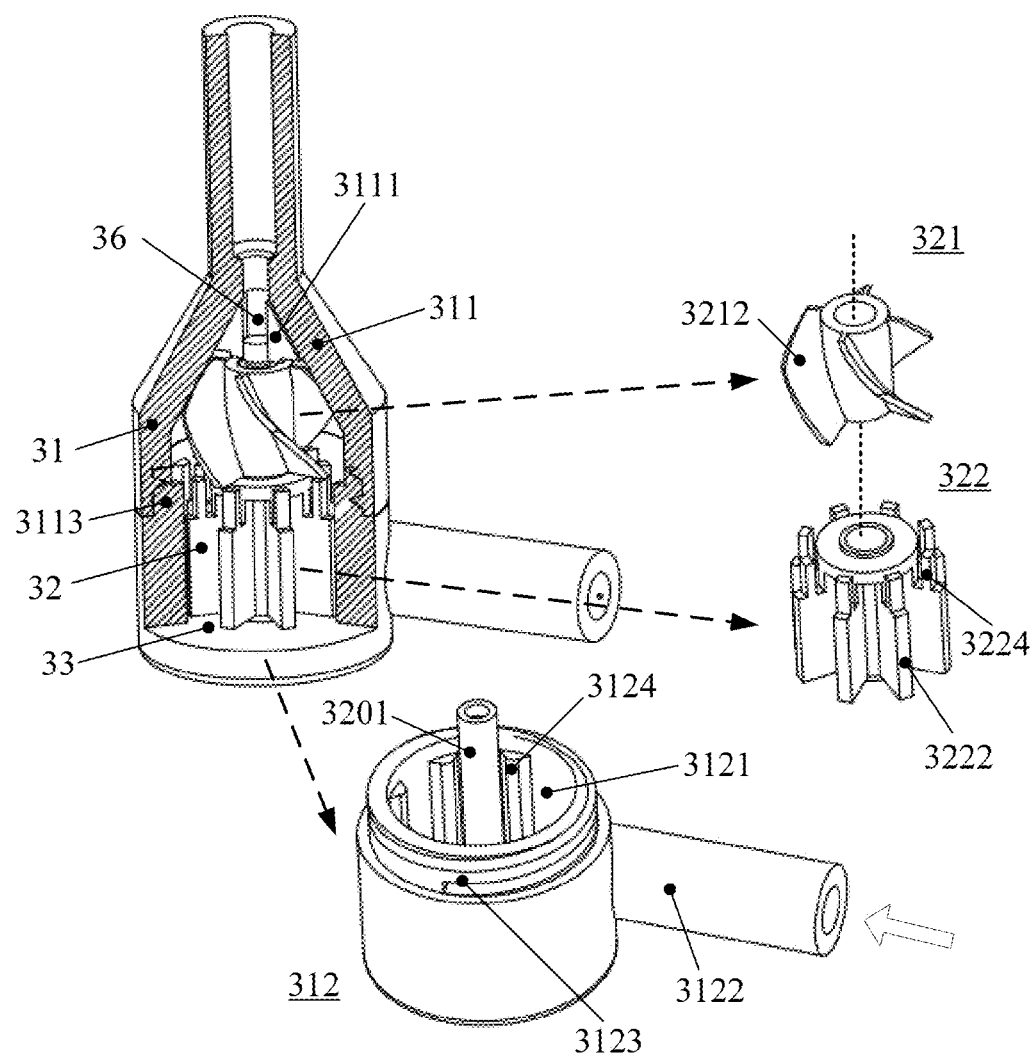
FIG. 6 is a schematic structural diagram of a device for synthesizing carbonated water according to one embodiment of the present application.

FIG. 6 is a schematic structural diagram of a device for synthesizing carbonated water according to one embodiment of the present application. As illustrated in FIG. 6, the device for synthesizing carbonated water includes: a device shell 31 and a blade structure 32 accommodated in the shell.

The device shell 31 includes an upper cover 311 and a lower cover 312. The lower cover 312 defines a first receiving chamber 3121 operable to receive the blade structure 32, and includes an input unit 3122 and sidewall ribs 3124.

The input unit 3122 is arranged on a side of the lower cover 312, and operable to communicate the first receiving chamber 3121 with the outside as an input unit. A plurality of sidewall ribs 3124 are arranged (for example, six or more), which are uniformly arranged on an inner sidewall of the first receiving chamber 3121. A rotation shaft 3201 of the blade structure 32 is arranged on the central axial line of the first receiving chamber 3121.

The upper cover 311 defines a second receiving chamber 3111 operable to receive the blade structure 32. The second receiving chamber 3111 is a tapered structure which is gradually narrowed. An orifice 36 operable to deliver mixed carbonated water is formed on a top end of the tapered structure.

A bonding surface between the upper cover 311 and the lower cover 312 is provided with a mated groove 3113 and step surface 3123, for assembling and retaining. The upper cover 311 and the lower cover 312 are connected to each other in a sealing fashion, and thus a good gas-tightness is achieved between the upper cover 311 and the lower cover 312 which cooperate to form a stirring chamber 33.

The blade structure 32 includes an upper turbine 321 and a lower turbine 322 that are coaxially arranged. The upper turbine 321 and the lower turbine 322 have the same rotation shaft 3201. These two turbines are not physically connected, and are capable of separately rotating.

The lower turbine 322 is received in the first receiving chamber 3121 of the lower cover 312, and is relatively fixed to the centre of the first receiving chamber 3121 via the rotation shaft 3201. The lower turbine 322 includes a plurality of uniformly arranged straight blades 3222 and blade ribs 3224.

A projection of the straight blade 3222 in a direction of the rotation shaft 3201 is a straight line, and the lower turbine 322 is radially pushed by the fluidizing working medium to rotate. For example, the straight blades 3222 may be plate-shaped blades that are perpendicularly arranged. The blade ribs 3224 are formed by upward extension of top portions of the blades 3222, and may be integrally molded with the blades 3222.

The upper turbine 321 is received in the second receiving chamber 3111 of the upper cover 311, and is arranged above the lower turbine 322. A plurality of spiral blades 3212 are uniformly arranged on the upper turbine 321. The spiral blades 3212 are spiral shape, and a projection of the spiral blade in the direction of the rotation shaft 3201 is a curve. The fluidizing working medium axially pushes the upper turbine 321 to rotate.

Firstly, in the water-gas mixing process, the carbon dioxide and the water are injected from their respective input units. After the carbon dioxide and the water are mixed in a mixing container, the carbon dioxide and the water are injected to the stirring chamber 33 from the input unit 3122 in the form of a water-gas mixture.

The water-gas mixture injected from the input unit 3122 has a predetermined high pressure (or flow rate), and impacts side surfaces of the blades 3222 of the lower turbine 322 along a tangential direction. Under impacts by the high-speed water-gas mixture, the lower turbine 322 starts rotating at a high speed, such that the water-gas mixture are equally divided according to the distribution angles of the blades 3222 of the lower turbine 322, and the delamination of water and gas is damaged to increase the contact area and the contact time.

In addition, the equally divided and stirred water-gas mixture is spun out from the lower turbine 322 along a radial direction under the effect of a centrifugal force, and impacts the sidewall ribs 3124 arranged on the inner sidewall of the lower cover 322 at a higher speed. Due to instantaneous great variations of the speed during the impacting, a greater water-gas pressure is produced locally to cause the carbon dioxide to be dissolved in the water.

After the water-gas mixture impacts the sidewall ribs 3124, the water-gas mixture may be broken up into numerous minute particles and the particles are rebounded to the rotation center of the lower turbine 322. These minute water particles and carbon dioxide may be sufficiently in contact with each other, such that the solubility of the carbon dioxide in the water is further improved. Nevertheless, the rebounded minute particles may be further spun out and impact the sidewall ribs 3124 for multiple times, such that mutual impacts and mixing between water and gas is strengthened.

Furthermore, due to constant supply of the water-gas mixture, the water-gas mixture that is stirred and fused by the lower turbine 322 may move towards the orifice 36. In this process, the water-gas mixture may impact the bottom portions of the blades of the upper turbine 321, and drive the upper turbine 321 to rotate, such that the water-gas mixture is equally divided again according to the blade shapes of the upper turbine 321, and a water-gas mixing ratio is balanced.

In addition, the blade shapes (the blades is pushed along a radial direction and an axial direction respectively to rotate) and positions of the upper turbine 321 and the lower turbine 322 are different. Therefore, a specific rotational speed difference is caused between the upper turbine 321 and the lower turbine 322. The rotational speed difference may cause the water-gas mixture to impact the blade ribs 3224 on the blades of the lower turbine, such that an effect similar to the effect of the sidewall ribs 3124 is achieved, the force of impact and mixing is strengthened, and thus more carbon dioxide may be dissolved in the water. In this way, the solubility of the carbon dioxide is improved.

Finally, the water-gas mixture formed by mixing is delivered from the orifice 36, and is provided for the user as the carbonated water.

Figure 7:
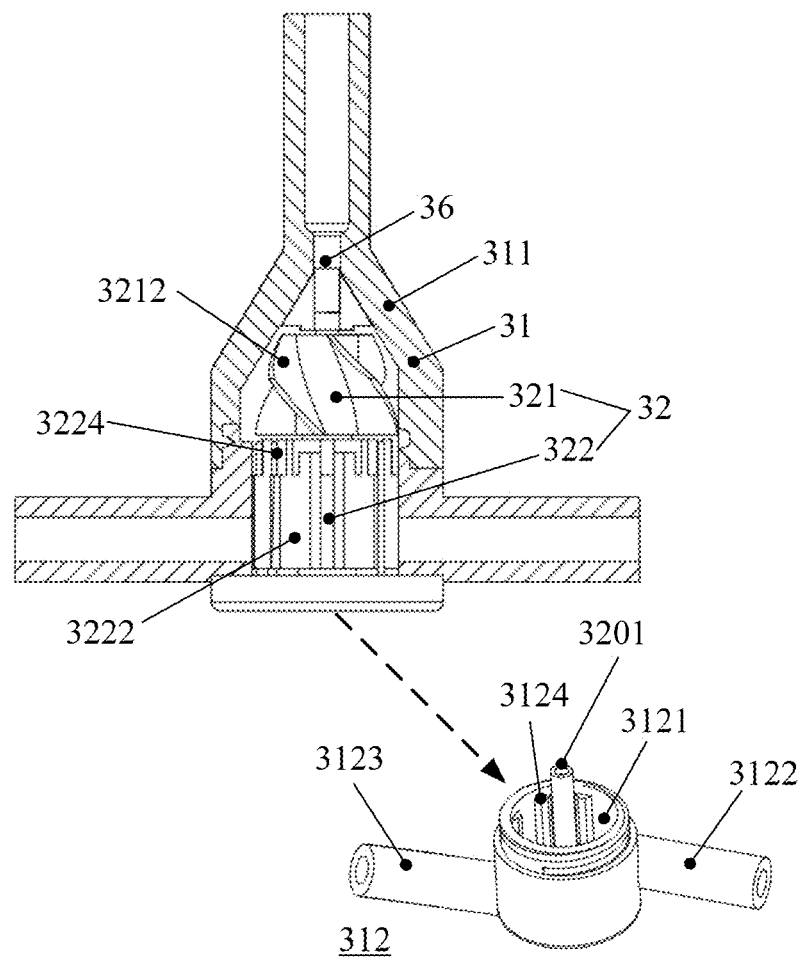
FIG. 7 is a schematic structural diagram of a device for synthesizing carbonated water according to another embodiment of the present application.

FIG. 7 is a schematic structural diagram of a device for synthesizing carbonated water according to another embodiment of the present application. As illustrated in FIG. 7, the device for synthesizing carbonated water includes: a device shell 31 and a blade structure 32 accommodated in the shell.

The device shell 31 includes an upper cover 311 and a lower cover 312. The lower cover 312 defines a first receiving chamber 3121 operable to receive the blade structure 32, and includes a carbon dioxide input unit 3122, a water input unit 3123 and sidewall ribs 3124.

Figure 8:
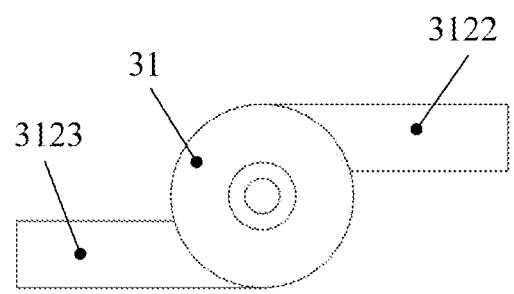
FIG. 8 is a top view of the device for synthesizing carbonated water as illustrated in FIG. 7.

The carbon dioxide input unit 3122 and the water input unit 3123 are respectively arranged on both sides of the lower cover 312, and are communicated with the first receiving chamber 3121. For the sake of smoothly driving the blade structure 32 to rotate, the carbon dioxide input unit 3122 and the water input unit 3123 are staggered and not arranged on the same straight line. For example, as illustrated in FIG. 8, these two input units are arranged at both ends of the lower cover 312 along a direction perpendicular to a diameter direction of the lower cover 312.

A plurality of sidewall ribs 3124 are arranged uniformly on an inner sidewall of the first receiving chamber 3121. A rotation shaft 3201 of the blade structure 32 is arranged on the central axial line of the first receiving chamber 3121.

The upper cover 311 defines a second receiving chamber operable to receive the blade structure 32 and includes an orifice 36. The second receiving chamber is a tapered structure which is gradually narrowed. The orifice 36 is arranged on a top portion of the tapered structure, and is operable to deliver mixed carbonated water.

The blade structure 32 includes an upper turbine 321 and a lower turbine 322 that are coaxially arranged. The upper turbine 321 and the lower turbine 322 have the same rotation shaft 3201. These two turbines are capable of separately rotating.

The lower cover 322 is received in the first receiving chamber 3121 of the lower cover 312, and is relatively fixed to the central axial line position of the first receiving chamber 3121 via the rotation shaft 3201. The lower turbine 322 includes a plurality of uniformly arranged straight blades 3222 and blade ribs 3224.

A projection of the straight blade 3222 in a direction of the rotation shaft 3201 is a straight line, and the lower turbine 322 is radially pushed by the fluidizing working medium to rotate. For example, the blades 3222 may be plate-shaped blades that are perpendicularly arranged. The blade ribs 3224 are formed by upward extension of top portions of the blades 3222, and may be integrally molded with the blades 3222.

The upper turbine 321 is received in the second receiving chamber of the upper cover 311, and is arranged above the lower turbine 322. A plurality of spiral blades 3212 are uniformly arranged on the upper turbine 321. The spiral blades 3212 are spiral shape, and a projection of the spiral blade in the direction of the rotation shaft is a curve. The fluidizing working medium axially pushes the upper turbine 321 to rotate.

In the water-gas mixing process, firstly the carbon dioxide or water with a predetermined high pressure (or flow rate) are respectively injected from both sides, and the injected carbon dioxide and water impact side surfaces of the blades 3222 of the lower turbine 322 along a tangential direction. Under impacts by the high-speed carbon dioxide and water, the lower turbine 322 starts rotating at a high speed, such that the water and the carbon dioxide are equally divided and mixed according to distribution angles of the blades 3222 of the lower turbine 322.

In addition, the equally divided and stirred water-gas mixture is spun out from the lower turbine 322 along a radial direction under the effect of a centrifugal force, and impacts the sidewall ribs 3124 arranged on the inner sidewall of the lower cover 312 at a higher speed. Due to instantaneous great variations of the speed during the impacting, a greater water-gas pressure is produced locally to cause the carbon dioxide to be dissolved in the water.

After the water-gas mixture impacts the sidewall ribs 3124, the water-gas mixture may be broken up into numerous minute particles and the particles are rebounded to the rotation center of the lower turbine 322. These minute water particles and carbon dioxide may be sufficiently in contact with each other, such that the solubility of the carbon dioxide in the water is further improved. Nevertheless, the rebounded minute particles may be further spun out and impact the ribs for multiple times, such that mutual impacts and mixing between water and gas is strengthened.

Furthermore, due to constant supply of the water-gas mixture, the water-gas mixture that is stirred and fused by the lower turbine 322 may move towards the orifice 36. In this process, the water-gas mixture may impact the bottom portions of the blades 3212 of the upper turbine 321, and drive the upper turbine 321 to rotate, such that the water-gas mixture is equally divided again according to the blade shapes of the upper turbine 321, and a water-gas mixing ratio is balanced.

In addition, the upper turbine 321 and the lower turbine 322 are different from each other in terms of blade shape and position. Therefore, a specific rotational speed difference is caused between the upper turbine 321 and the lower turbine 322. The rotational speed difference may cause the water-gas mixture to impact the blade ribs 3224 on the blades 3222 of the lower turbine 322, such that an effect similar to the effect of the sidewall ribs 3124 is achieved, the force of impact and mixing is strengthened, and thus more carbon dioxide may be dissolved in the water. In this way, the solubility of the carbon dioxide is improved.

Finally, the mixed carbon dioxide and water are delivered from the orifice 36, and are provided for the user as the carbonated water.

Figure 9:
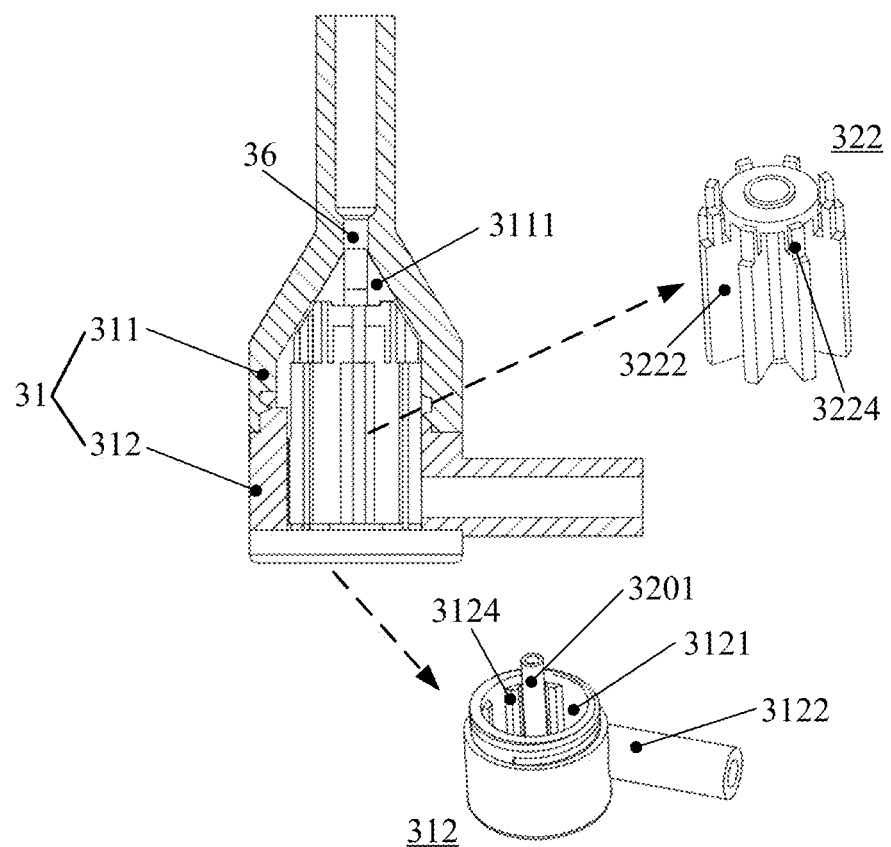
FIG. 9 is a schematic structural diagram of a device for synthesizing carbonated water according to still another embodiment of the present application.

FIG. 9 is a schematic structural diagram of a device for synthesizing carbonated water according to still another embodiment of the present application. As illustrated in FIG. 9, the device for synthesizing carbonated water includes: a device shell 31 and a blade structure 32 accommodated in the shell.

The device shell 31 includes an upper cover 311 and a lower cover 312. The lower cover 312 defines a first receiving chamber 3121 and includes an input unit 3122. The input unit 3122 is arranged on a side of the lower cover 312, and operable to communicate the first receiving chamber 3121 with the outside. A plurality of sidewall ribs 3124 are uniformly arranged on an inner sidewall of the first receiving chamber 3121. A rotation shaft 3201 of the blade structure 32 is arranged on the center of the first receiving chamber 3121.

The upper cover 311 defines a second receiving chamber 3111 and includes an orifice 36. The second receiving chamber 3111 is a tapered structure which is gradually narrowed. The orifice 36 operable to deliver mixed carbonated water is formed on a top end of the tapered structure.

The second receiving chamber 3111 of the upper cover 311 and the first receiving chamber 3121 of the lower cover 312 form a receiving space operable to receive the blade structure 32. The upper cover 311 and the lower cover 312 are connected to each other in a sealing fashion, and thus a good gas-tightness is achieved between the upper cover 311 and the lower cover 312 which cooperate to form a stirring chamber.

The blade structure 32 includes a turbine 322. A rotation shaft 3201 of the turbine 322 is arranged at the center of the first receiving chamber 3121, and the turbine 322 rotates around the rotation shaft 3201 at a high speed.

The turbine 322 includes a plurality of uniformly arranged straight blades 3222 and blade ribs 3224. A projection of the straight blade 3222 in a direction of the rotation shaft 3201 is a straight line, and the turbine 322 is radially pushed by the fluidizing working medium to rotate. For example, the blades 3222 may be plate-shaped blades that are perpendicularly arranged. The blade ribs 3224 are formed by upward extension of top portions of the blades 3222, and may be integrally molded with the blades 3222.

In the water-gas mixing process, the carbon dioxide and the water are injected from their respective input units. After the carbon dioxide and the water are mixed in a mixing container, the carbon dioxide and the water are injected to a stirring device 30 in the form of a water-gas mixture.

The water-gas mixture injected has a predetermined high pressure (or flow rate), and impacts side surfaces of the blades 3222 of the turbine 322 along a tangential direction. Under impacts by the high-speed water-gas mixture, the turbine 322 starts rotating at a high speed, such that the water-gas mixture are equally divided according to distribution angles of the blades 3222 of the turbine 322, and the delamination of water and gas is damaged to increase the contact area and the contact time.

In addition, the equally divided and stirred water-gas mixture is spun out from the turbine 322 along a radial direction under the effect of a centrifugal force, and impacts the sidewall ribs 3124 arranged on the inner sidewall of the lower cover 312 at a higher speed. Due to instantaneous great variations of the speed during the impacting, a greater water-gas pressure is produced locally to cause more carbon dioxide to be dissolved in the water.

After the water-gas mixture impacts the sidewall ribs 3124, the water-gas mixture may be broken up into numerous minute particles and the particles are rebounded to the rotation center of the turbine 322. These minute water particles and carbon dioxide may be sufficiently in contact with each other, such that the solubility of the carbon dioxide in the water is further improved. Nevertheless, the rebounded minute particles may be further spun out and impact the sidewall ribs 3124 for multiple times, such that mutual impacts and mixing between water and gas is strengthened.

Furthermore, due to constant supply of the water-gas mixture, the water-gas mixture that is stirred and fused by the turbine 322 may move towards the orifice 36. Due to the effect of the orifice 36, some turbulence of the water-gas mixture may reflux and impact the blade ribs 3224 on the blades 3222 of the turbine 322, such that an effect similar to the effect of the sidewall ribs 3124 is achieved, the force of impact and mixing is strengthened, and thus more carbon dioxide may be dissolved in the water. In this way, the solubility of the carbon dioxide is improved. Finally, the carbonated water upon mixing is delivered from the orifice 36.

The device for synthesizing carbonated water according to the embodiment of the present application equally divides the water-gas mixture according to the distribution angles of the blades of the turbine by rotation of the turbine, such that the delamination of water and gas is prevented, and the contact area and the contact time are increased. In addition, the centrifugal force of the turbine may drive the water-gas mixture to impact the ribs for one time or multiple times, such that the solubility of the carbon dioxide in the water is improved.

According to the device for synthesizing carbonated water according to the embodiment of the present application, one or a plurality of device units may be added to constitute a complete system for preparing carbonated water. For example, a static mixing tube which is internally provided with an X-shaped partition block may be connected to the output unit of the device for synthesizing carbonated water, to improve the solubility of the carbon dioxide; or water pump and a check valve are respectively connected to the water input unit and the carbon dioxide input unit to control the pressure of the input water and carbon dioxide, to hence efficiently prepare carbonated water with a good taste.

Figure 10:
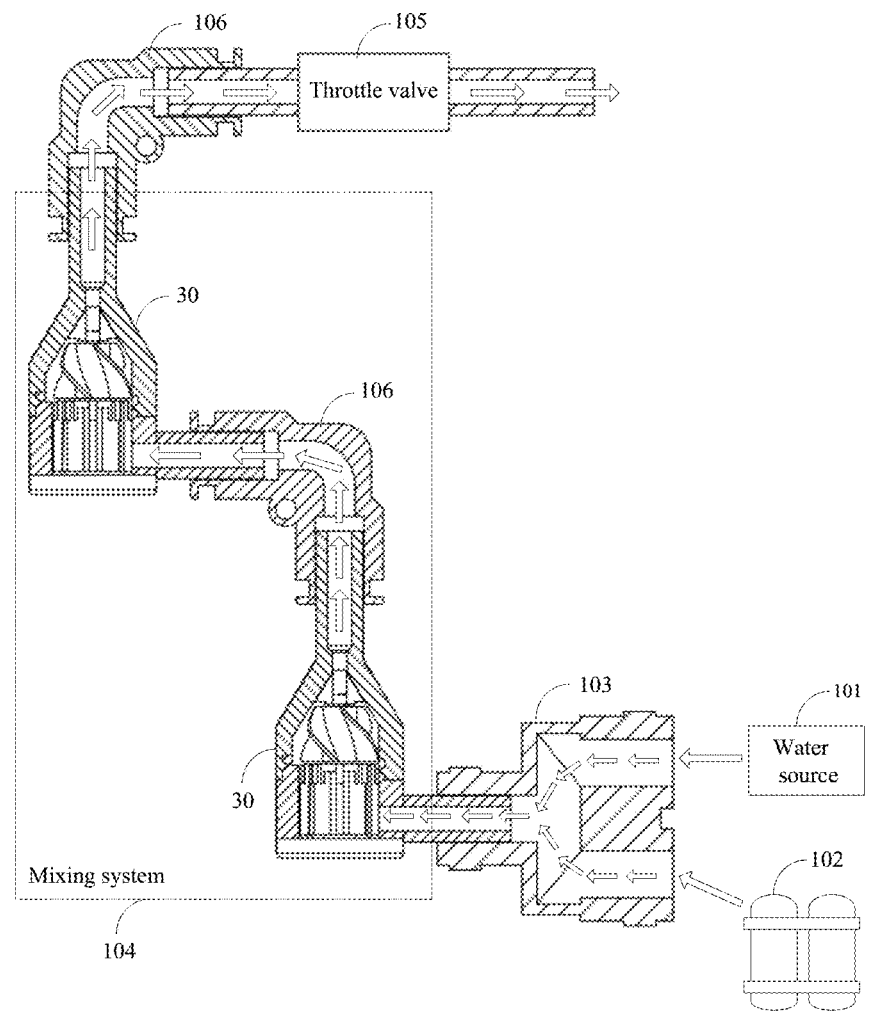
FIG. 10 is a schematic structural diagram of a system for preparing carbonated water according to one embodiment of the present application.

FIG. 10 is a schematic structural diagram of a system for preparing carbonated water according to one embodiment of the present application. As illustrated in FIG. 10, the system for preparing carbonated water includes: a water source 101, a gas source 102, a three-way connector 103, a mixing system 104, a throttle valve 105 and communication pipes 106.

The water source 101 is a device operable to supply water with a predetermined flow rate and pressure. The water source 101 may be specifically a water pump or a tap water pipe, as long as water is non-interruptedly supplied at a specific pressure and flow rate.

The gas source 102 is a device operable to supply carbon dioxide with a predetermined pressure. The gas source 102 may be specifically a carbon dioxide gas cylinder or tank where a reducing valve is arranged, which constantly supplies carbon dioxide to the system after the pressure is regulated to the predetermined pressure by the reducing valve.

The three-way connector 103 is a connection part which provides three interconnected conduit joints. The two conduit joints are used as input units which are respectively connected to the gas source 102 and the water source 101 for taking the carbon dioxide and the water. The remaining conduit joint is used as an output unit which delivers the water-gas mixture.

The mixing system 104 includes one or a plurality of cascaded and series-connected devices for synthesizing carbonated water. The mixing system 104 has a raw material input unit and a carbonated water output unit. The raw material input unit is connected to the output unit of the three-way connector 103, and the carbonated water output unit delivers carbonated water obtained upon mixing and fusion.

Specifically, the number of cascaded and series-connected devices for synthesizing carbonated water may be determined according to the actual situation, for example, two or more. Increasing the number of devices for synthesizing carbonated water is favorable to improvement of the solubility of the carbon dioxide in the water.

The throttle valve 105 is connected to the carbonated water output unit of the mixing system 104, and is operable to regulate and control a delivery amount of the carbonated water. The throttle valve 105 may specifically employ any type of regulation-type valve to control the delivery amount of the carbonated water.

The communication pipes 106 is a sealed pipe operable to connect the above different device units, and the communication pipes 106 may employ any type of connection structure to connect to ports of the various device units, for example, a fast connector, flange connector or clamp connection. The communication pipes 106 may be made of any type of material satisfying pressure-bearing and use requirements, for example, PU plastics or stainless steels.

A person skilled in the art may reduce or add one or a plurality of device units in the system for preparing carbonated water according to the actual needs. For example, a device for synthesizing carbonated water having two input units (that is, the carbon dioxide input unit and the water input unit) is used as a first-stage device for synthesizing carbonated water of the mixing system, such that the mixing system has two different raw material input unit. In this way, the three-way connector is saved, and the gas source and the water source may be respectively connected to the device for synthesizing carbonated water via different raw material input units.

Figure 11:
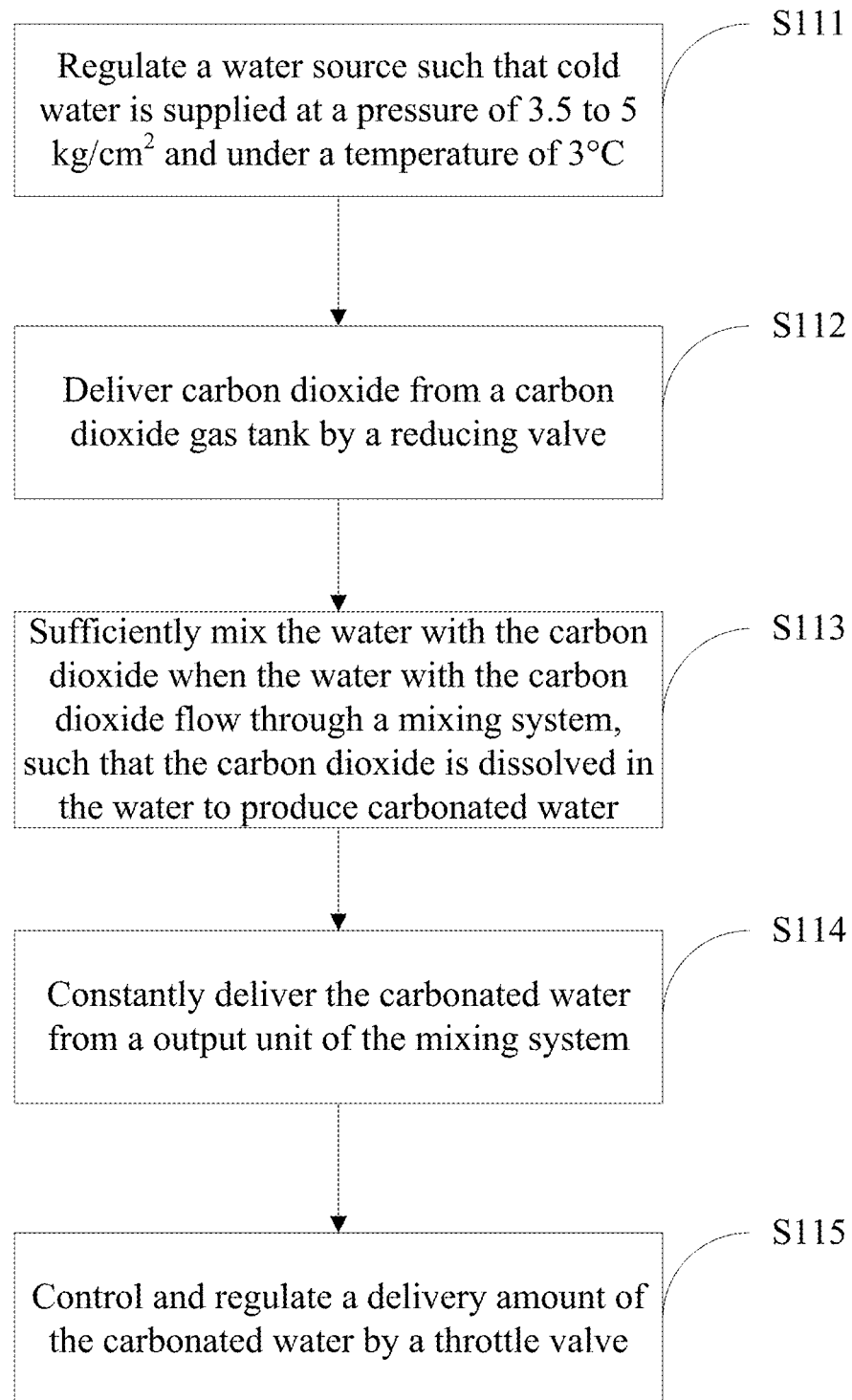
FIG. 11 is a flowchart of a preparation method using the system for preparing carbonated water as illustrated in FIG. 10.

A process of preparing carbonated water by using the system for preparing carbonated water according to the embodiment of the present application is described in detail hereinafter. As illustrated in FIG. 11, the method includes the following steps:

S111: A water source is regulated such that cold water is supplied at a pressure of 3.5 to 5 kg/cm² and under a temperature of 3° C.

S112: Carbon dioxide is delivered from a carbon dioxide gas tank by a reducing valve. The carbon dioxide is delivered at a pressure of 3.5 to 5 kg/cm².

S113: The water and the carbon dioxide are sufficiently mixed when flowing through a mixing system, such that the carbon dioxide is dissolved in the water to produce carbonated water.

In this embodiment, the mixing system includes two stages of devices for synthesizing carbonated water. In some other embodiments, the number of cascaded and series-connected devices for synthesizing carbonated water in the mixing system may be adjusted according to the actual needs.

S114: The carbonated water is constantly delivered from an output unit of the mixing system.

S115: A delivery amount of the carbonated water is controlled and regulated by a throttle valve. In this embodiment, the finally produced carbonated water may have a concentration of 3.5 to 3.6 V/V.

In the system for preparing carbonated water according to the embodiment of the present application, neither complicated water level and gas pressure control circuits nor high-pressure resistant storage tank is needed. Further, no extra energy is consumed (rotation of the turbine is driven by the pressure of the water pump and the pressure of the carbon dioxide), such that carbonated water with a high concentration may be prepared at a low cost.

In addition, the mixing system employs turbine dynamic stirring and impacting, such that a wider range of gas pressures and water pressures is provided. In this way, routine maintenance of the mixing system is reduced, and the mixing system is applicable to more scenarios.

Finally, it should be noted that the above embodiments are merely used to illustrate the technical solutions of the present application rather than limiting the technical solutions of the present application. Under the concept of the present application, the technical features of the above embodiments or other different embodiments may be combined, the steps therein may be performed in any sequence, and various variations may be derived in different aspects of the present application, which are not detailed herein for brevity of description. Although the present application is described in detail with reference to the above embodiments, persons of ordinary skill in the art should understand that they may still make modifications to the technical solutions described in the above embodiments, or make equivalent replacements to some of the technical features; however, such modifications or replacements do not cause the essence of the corresponding technical solutions to depart from the spirit and scope of the technical solutions of the embodiments of the present application.

What is claimed is:

1. A device for synthesizing carbonated water, comprising:
    a device shell, in which a stirring chamber is defined;
    a rotation shaft, which is accommodated in the stirring chamber;
    a blade structure, which is accommodated in the stirring chamber and rotatable around the rotation shaft;
    a plurality of sidewall ribs, which are distributed in the stirring chamber and arranged on a sidewall of the device shell, each sidewall rib being one or more collision interfaces;
    a plurality of blade ribs, which are arrange on the blade structure, each blade rib being one or more collision interfaces;
    wherein the collision interface provides a solid and tough collision surface and configured to convert momentum into a great water-gas pressure;
    an input unit, which is arranged on the device shell, positioned below the blade structure, communicated with the stirring chamber, and operable to receive water and carbon dioxide; and
    an output unit, which is arranged on the device shell, positioned above the blade structure, communicated with the stirring chamber, and operable to deliver carbonated water with a predetermined concentration;
    wherein the blade structure comprises a lower turbine and an upper turbine arranged above the lower turbine;
    wherein the lower turbine is uniformly provided with several blades, and the lower turbine is rotatable about the rotation shaft to stir the water and the carbon dioxide flowing through the blades;
    wherein the upper turbine is provided with blades, the blade shape of the upper turbine is different from that of the lower turbine, and the upper turbine and the lower turbine are rotatable independently of one other;
    wherein the blades of the lower turbine are straight blades that are projected as straight lines in a direction of the rotation shaft the blades of the upper turbine are spiral blades that are projected as curve lines in the direction of the rotation shaft; and the output unit is positioned above the upper turbine.

2. The device according to claim 1, wherein the device shell comprises an upper cover and a lower cover that are connected in a sealing fashion; wherein
    a first receiving chamber is defined inside the lower cover and a second receiving chamber is defined inside the upper cover, the first receiving chamber and the second receiver chamber cooperating with each other to define the stirring chamber; and
    the plurality of sidewall ribs are arranged on a sidewall of the lower cover.

3. The device according to claim 2, wherein the first receiving chamber is a cylindrical chamber and the second receiving chamber is a tapered chamber; wherein a tapered top of the second receiving chamber is the output unit.

4. The device according to claim 3, wherein the rotation shaft coincides with an axial line of the first receiving chamber and the output unit is arranged on the axial line.

5. A device for synthesizing carbonated water, comprising:
    a device shell, in which a stirring chamber is defined;
    a rotation shaft, which is accommodated in the stirring chamber;
    a blade structure, which is accommodated in the stirring chamber and rotatable around the rotation shaft;
    a plurality of sidewall ribs, which are distributed in the stirring chamber and arranged on a sidewall of the device shell, each sidewall rib being one or more collision interfaces;
    a plurality of blade ribs, which are arrange on the blade structure, each blade rib being one or more collision interfaces;
    wherein the collision interface provides a solid and tough collision surface and configured to convert momentum into a great water-gas pressure;

a water input unit, which is arranged on the device shell, positioned below the blade structure, communicated with the stirring chamber, and operable to deliver water;

a carbon dioxide input unit, which is arranged on an opposite side of the water input unit, communicated with the stirring chamber, and operable to deliver carbon dioxide; and an output unit, which is arranged on the device shell, positioned above the blade structure, communicated with the stirring chamber, and operable to deliver carbonated water with a predetermined concentration;

wherein the blade structure comprises a lower turbine and an upper turbine arranged above the lower turbine;

wherein the lower turbine is uniformly provided with several blades, and the lower turbine is rotatable about the rotation shaft to stir the water and the carbon dioxide flowing through the blades;

wherein the upper turbine is provided with blades, the blade shape of the upper turbine is different from that of the lower turbine, and the upper turbine and the lower turbine are rotatable independently of one other;

wherein the blades of the lower turbine are straight blades that are projected as straight lines in a direction of the rotation shaft; the blades of the upper turbine are spiral blades that are protected as curve lines in the direction of the rotation shaft; and the output unit is positioned above the upper turbine.

6. The device according to claim 5, wherein the device shell comprises an upper cover and a lower cover that are connected in a sealing fashion; wherein a first receiving chamber is defined inside the lower cover and a second receiving chamber is defined inside the upper cover, the first receiving chamber and the second receiver chamber cooperating with each other to define the stirring chamber; and the plurality of sidewall ribs are arranged on a sidewall of the lower cover.

7. The device according to claim 6, wherein the first receiving chamber is a cylindrical chamber and the second receiving chamber is a tapered chamber; wherein a tapered top of the second receiving chamber is the output unit.

8. The device according to claim 7, wherein the rotation shaft coincides with an axial line of the first receiving chamber and the output unit is arranged on the axial line.

9. A system for preparing carbonated water, comprising: one or a plurality of devices for synthesizing carbonated water, a water source, a gas source, and communication pipe; wherein
each device for synthesizing carbonated water comprises:
a device shell, in which a stirring chamber is defined;
a rotation shaft, which is accommodated in the stirring chamber;
a blade structure, which is accommodated in the stirring chamber and rotatable around the rotation shaft;
a plurality of sidewall ribs, which are distributed in the stirring chamber and arranged on a sidewall of the device shell, each sidewall rib being one or more collision interfaces;
a plurality of blade ribs, which are arrange on the blade structure, each blade rib being one or more collision interfaces;

wherein the collision interface provides a solid and tough collision surface and configured to convert momentum into a great water-gas pressure;

at least one input unit, which are arranged on the device shell, positioned below the blade structure, communicated with the stirring chamber, and operable to receive water and carbon dioxide; and an output unit, which is arranged on the device shell, positioned above the blade structure, communicated with the stirring chamber, and operable to deliver carbonated water with a predetermined concentration;

the water source and the gas source are connected to the at least one input unit of one of the devices for synthesizing carbonated water; and the plurality of devices for synthesizing carbonated water are cascaded and connected in series sequentially via the communication pipes:

wherein the blade structure comprises a lower turbine and an upper turbine arranged above the lower turbine;

wherein the lower turbine is uniformly provided with several blades, and the lower turbine is rotatable about the rotation shaft to stir the water and the carbon dioxide flowing through the blades;

wherein the upper turbine is provided with blades, the blade shape of the upper turbine is different from that of the lower turbine, and the upper turbine and the lower turbine are rotatable independently of one other;

wherein the blades of the lower turbine are straight blades that are projected as straight lines in a direction of the rotation shaft; the blades of the upper turbine are spiral blades that are projected as curve lines in the direction of the rotation shaft; and the output unit is positioned above the upper turbine.

10. The system according to claim 9, wherein when the water source and the gas source are connected to one input unit of one of the devices for synthesizing carbonated water, the system further comprises: a three-way connector; wherein
the three-way connector comprises a first conduit joint, a second conduit joint and a third conduit joint that are in communication with each other;
the water source and the gas source are connected to the first conduit joint and the second conduit joint of the three-way connector respectively, and the third conduit joint is connected to the one input unit of one of the devices for synthesizing carbonated water.

11. The system according to claim 9, wherein the at least one input unit comprises a water input unit and a carbon dioxide input unit, the carbon dioxide input unit is arranged on an opposite side of the water input unit;
the water source and the gas source are connected to the water input unit and the carbon dioxide input unit of the carbonated water synthesis device respectively.

12. The system according to claim 9, further comprising: a throttle valve; wherein the throttle valve is connected to an output unit of one of the devices for synthesizing carbonated water, and operable to regulate an output flow rate of carbonated water.

* * * * *